(12) United States Patent
Vaughan et al.

(10) Patent No.: US 12,531,743 B2
(45) Date of Patent: Jan. 20, 2026

(54) COMPUTER-IMPLEMENTED SYSTEM AND METHOD FOR TRANSFERRING ACCESS TO DIGITAL RESOURCE

(71) Applicant: nChain Holdings Limited, St. John's (AG)

(72) Inventors: Owen Vaughan, London (GB); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 894 days.

(21) Appl. No.: 17/280,758

(22) PCT Filed: Sep. 19, 2019

(86) PCT No.: PCT/IB2019/057917
§ 371 (c)(1),
(2) Date: Mar. 26, 2021

(87) PCT Pub. No.: WO2020/065460
PCT Pub. Date: Apr. 2, 2020

(65) Prior Publication Data
US 2021/0344500 A1   Nov. 4, 2021

(30) Foreign Application Priority Data
Sep. 28, 2018  (GB) ..................... 1815816

(51) Int. Cl.
*H04L 9/32* (2006.01)
*H04L 9/14* (2006.01)
(Continued)

(52) U.S. Cl.
CPC ............. *H04L 9/3239* (2013.01); *H04L 9/14* (2013.01); *H04L 9/3073* (2013.01); *H04L 9/3247* (2013.01); *H04L 9/50* (2022.05)

(58) Field of Classification Search
None
See application file for complete search history.

(56) References Cited

U.S. PATENT DOCUMENTS 10,050,779 B2    8/2018   Alness et al.
11,082,412 B2 *  8/2021   Leavy ................. H04L 9/14
(Continued)

FOREIGN PATENT DOCUMENTS

CN    106656974 A    5/2017
TW    201733304 A    9/2017
(Continued)

OTHER PUBLICATIONS

Zhang, H., Wang, J. and Ding, Y., 2019. Blockchain-based decentralized and secure keyless signature scheme for smart grid. Energy, 180, pp. 955-967. (Year: 2019).*
(Continued)

*Primary Examiner* — Luu T Pham
*Assistant Examiner* — Edward X Long
(74) *Attorney, Agent, or Firm* — Tarolli, Sundheim, Covell & Tummino LLP

(57) ABSTRACT

A computer-implemented method for transferring access to, or control of, a resource is provided. The method comprises the steps of providing a blockchain transaction redeemable to transfer control of a resource by providing a data item ($S_1$) to the first blockchain transaction, wherein the data item is determinable only by a controller of both a revealable value (s) and a secret value ($k_0$), and providing the revealable value to a controller of the secret value to enable said controller to determine the data item. The method may be carried out using the Bitcoin blockchain, or using a combination of different blockchains.

6 Claims, 6 Drawing Sheets

(51) Int. Cl.
  *H04L 9/30* (2006.01)
  *H04L 9/00* (2022.01)

(56) References Cited

U.S. PATENT DOCUMENTS

| | | | | |
|---|---|---|---|---|
| 11,704,400 | B2* | 7/2023 | Embrechts | H04W 4/025 726/20 |
| 2011/0194694 | A1* | 8/2011 | Struik | H04L 9/3252 380/255 |
| 2011/0213982 | A1* | 9/2011 | Brown | H04L 9/3252 713/176 |
| 2013/0191632 | A1* | 7/2013 | Spector | H04L 9/085 713/155 |
| 2017/0109744 | A1* | 4/2017 | Wilkins | H04L 9/3236 |
| 2019/0172057 | A1 | 6/2019 | Vincent | |
| 2020/0242603 | A1* | 7/2020 | Salkintzis | H04W 12/06 |

FOREIGN PATENT DOCUMENTS

| | | |
|---|---|---|
| TW | 201810151 A | 3/2018 |
| TW | 201810990 A | 3/2018 |
| WO | 2018/020369 A1 | 2/2018 |
| WO | 2018020372 A1 | 2/2018 |
| WO | 2018020375 A1 | 2/2018 |
| WO | 2018165940 A1 | 9/2018 |

OTHER PUBLICATIONS

Aitzhan, N.Z. and Svetinovic, D., 2016. Security and privacy in decentralized energy trading through multi-signatures, blockchain and anonymous messaging streams. IEEE transactions on dependable and secure computing, 15(5), pp. 840-852. (Year: 2016).*
Antonopoulos, "Mastering Bitcoin—Unlocking Digital Cryptocurrencies," O'Reilly Media, Inc., Dec. 20, 2014, 282 pages.
International Search Report and Written Opinion mailed Nov. 7, 2019, Patent Application No. PCT/IB2019/057917, 10 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0;prev_next=prev, 2 pages.
UK IPO Search Report mailed Mar. 12, 2019, Patent Application No. GB18185816.2, 4 pages.
Zeng et al., "A Nonoutsourceable Puzzle under Ghost Rule," 15th Annual Conference on Privacy, Security and Trust, 2017, 10 pages.
Shigeyuki Azuchi: "The structure of Scriptless Script and potential," [online], Jul. 21, 2018, [Aug. 21, 2023 search], the Internet URL:https://speakerdeck.com/azuchi/scriptless-scriptfalseshi-zumitopotensiyaru, pp. 1-18.
Techmedia-Think, Atomic Swap realized by Scriptless Script, [online], Nov. 11, 2017, the Internet URL: https://techmedia-think.hatenablog.com/entry/2017/11/11/134311, filed Aug. 21, 2023 search, pp. 1-5.

* cited by examiner

Figure 1

| Table 1: DER encoding of Signature (r, s) | | |
|---|---|---|
| Description | Length | Data |
| Sequence identifier | 1 | 30 |
| Length of sequence | 1 | 46 |
| Integer identifier | 1 | 02 |
| Byte-length of integer r | 1 | 21 |
| Indicates the leading byte is non-zero | 1 | 00 |
| r | 32 | e9d34347e597e8b335745c6f8353580f4cdb4bcde2794ef7aab915d996642c7 |
| Integer identifier | 1 | 02 |
| Byte-length of integer s | 1 | 21 |
| Indicates the leading byte is non-zero | 1 | 00 |
| s | 32 | df2ccb5c2c7243c55bde34934bd55efbdac21c74a20bb7b438d1b6de3311f |
| Sighash type | 1 | 01 |

Figure 2

Table 2: Script to Extract r Part of Signature

| Stack | Script | Description |
|---|---|---|
| empty | <Sig P> OP_3 OP_SPLIT OP_NIP OP_1 OP_SPLIT OP_SWAP OP_SPLIT OP_DROP | |
| <Sig P> | OP_3 OP_SPLIT OP_NIP OP_1 OP_SPLIT OP_SWAP OP_SPLIT OP_DROP | Constants are added to the stack |
| <Sig P [:3]> <Sig P [3:]> | OP_NIP OP_1 OP_SPLIT OP_SWAP OP_SPLIT OP_DROP | Sig split on the third byte |
| <Sig P [3:]> | OP_1 OP_SPLIT OP_SWAP OP_SPLIT OP_DROP | Second-to-top stack item removed |
| <Sig P [3:4]> <Sig P [4:]> | OP_SWAP OP_SPLIT OP_DROP | Sig split on the fourth byte. |
| <Sig P [4:]> <Sig P [3:4]> | OP_SPLIT OP_DROP | Top two items on stack swapped |
| <Sig P [4:36/37]> <Sig P [36/37:]> | OP_DROP | Sig split on fifth byte to end of r |
| <Sig P [4:36/37]> | | Top item on stack dropped |

COMPUTER-IMPLEMENTED SYSTEM AND METHOD FOR TRANSFERRING ACCESS TO DIGITAL RESOURCE

This disclosure relates generally to the secure transfer of access to, or control of, resources, and more particularly to atomic transfer of such access, or control, via cryptographic keys transmitted using one or more blockchain transactions. The disclosure is particularly suited, but not limited to, use in any variation of the Bitcoin protocol.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluates to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain.

The concept of an atomic swap has previously been discussed in the cryptocurrency community. The exchange between the parties is "atomic" in the sense that all participants receive their desired resource (e.g. cryptocurrency token or coin) or none do. At the time of writing, Wikipedia describes an atomic swap as "a proposed feature in cryptocurrencies that allows for the exchange of one cryptocurrency for another cryptocurrency without the need for a trusted third party. In traditional cryptocurrencies a trusted third party such as a cryptocurrency exchange is necessary to perform a swap of cryptocurrencies in order to prevent one party from sending a currency without receiving a currency in return. An atomic swap system uses a hash time-locked smart contract so that a party must deliver the currency to be swapped within a specified time, or else the transaction will be cancelled. This preserves atomicity in that either the swap will take place, or no currency will be swapped"—https://en.wikipedia.org/wiki/Atomic_swap.

Thus, atomic swaps offer enhanced security in respect of transfers conducted over a blockchain, because removal of the need for a trusted third party removes the risk of exploits and malicious interventions—a number of security breaches or "hacks" have been performed in respect of cryptocurrency exchanges such as Mount Gox.

Thus, it is desirable to provide a cryptographically-enforced resource exchange method of atomically exchanging resources having the trustlessness and immutability provided by blockchain technology, and which enhances security in respect of exchanges conducted over blockchain-implemented networks.

Such an improved solution has now been devised.

Thus, in accordance with the present disclosure there is provided a method as defined in the appended claims.

In accordance with the disclosure there may be provided a computer-implemented method. It may be described as a method for transferring control of a resource. It may control transfer of a resource across or via a blockchain network. Additionally or alternatively, it may be described as a secure transfer method. Additionally or alternatively, it may be described as a security method for controlling when and/or by whom a controlled resource can be accessed. The resource may be a resource stored on or reference from the blockchain, such as a portion of cryptocurrency or a tokenised item/asset/entity.

The method may comprise the steps of: providing a first blockchain transaction redeemable to enable access to a first resource by providing at least a data item to the first blockchain transaction, wherein the data item is determinable only by a controller of both a revealable value and a secret value; and providing the revealable value to a controller of the secret value to enable said controller to determine the data item. In the context of the present disclosure, "enable access" includes, but is not limited to, transferring control of a resource such as an amount of cryptocurrency, or enabling access to a document, online resource, or to a security access code.

This method enables access to, or control of, a resource to be securely transferred using one or more blockchains without requiring the protocols of those blockchains to share one or more common hash functions, thereby providing the advantage of increasing the number of blockchains across which the transfer can be effected. The security and efficiency of such a transfer of control or access is thus preserved while increasing the versatility of the transfer. It also allows transfer across otherwise incompatible network/blockchain protocols.

The data item may comprise a first private key of a first cryptographic key pair.

The first blockchain transaction may further require providing a second private key of a second cryptographic key pair to be redeemable, wherein the second cryptographic key pair is associated with an intended recipient of the first resource.

This provides the advantage of increasing the security of the method by preventing any actor with undesired knowledge of the first private key from redeeming the first transaction.

The first private key may be a deterministic private key of a deterministic cryptographic key pair, wherein the deterministic public key of said pair is derived using a first public key of the first cryptographic key pair and a second public key of the second cryptographic key pair.

This further increases the security of the method by providing a level of obfuscation such that undesired revelation of the first private key does not compromise the first transaction while maintaining an intended recipient's ability to redeem the first transaction.

The step of providing the revealable value to said controller may comprise: providing a second blockchain transaction redeemable to enable access to a second resource by providing at least the data item to the second blockchain transaction, wherein redemption of the second blockchain transaction causes the revealable value to be provided to said controller; and redeeming the second blockchain transaction.

This enables atomic swaps of resource access or control to be performed without requiring the use of hash functions, thereby providing a mechanism for secure and simultaneous digital exchanges to be performed without restriction to those blockchain protocols that share common hash functions.

Redemption of any above blockchain transaction may comprise calculating a cryptographic signature corresponding to the data item and comparing a value stored in the transaction to at least a portion of the calculated signature.

This enables a significant proportion of a cryptographic algorithm to be performed off-block, thereby distributing the necessary tasks for maintaining a level of cryptographic security from the blockchain and providing the related advantages of reducing the size of the first transaction (and therefore reducing storage requirements) and increasing the efficiency of the method.

The secret value may be an ephemeral key used in a digital signature process.

The disclosure also provides a system, comprising: a processor; and memory including executable instructions that, as a result of execution by the processor, causes the system to perform any embodiment of the computer-implemented method described herein.

The disclosure also provides a non-transitory computer-readable storage medium having stored thereon executable instructions that, as a result of being executed by a processor of a computer system, cause the computer system to at least perform an embodiment of the computer-implemented method described herein.

These and other aspects of the present disclosure will be apparent from and elucidated with reference to, the embodiments described herein. Embodiments of the present disclosure will now be described, by way of example only, and with reference to the accompany drawings, in which:

FIG. 1 illustrates a Distinguished Encoding Rules table of the prior art;

FIG. 2 illustrates a table containing a script for extracting a portion of a signature;

Figure 3:
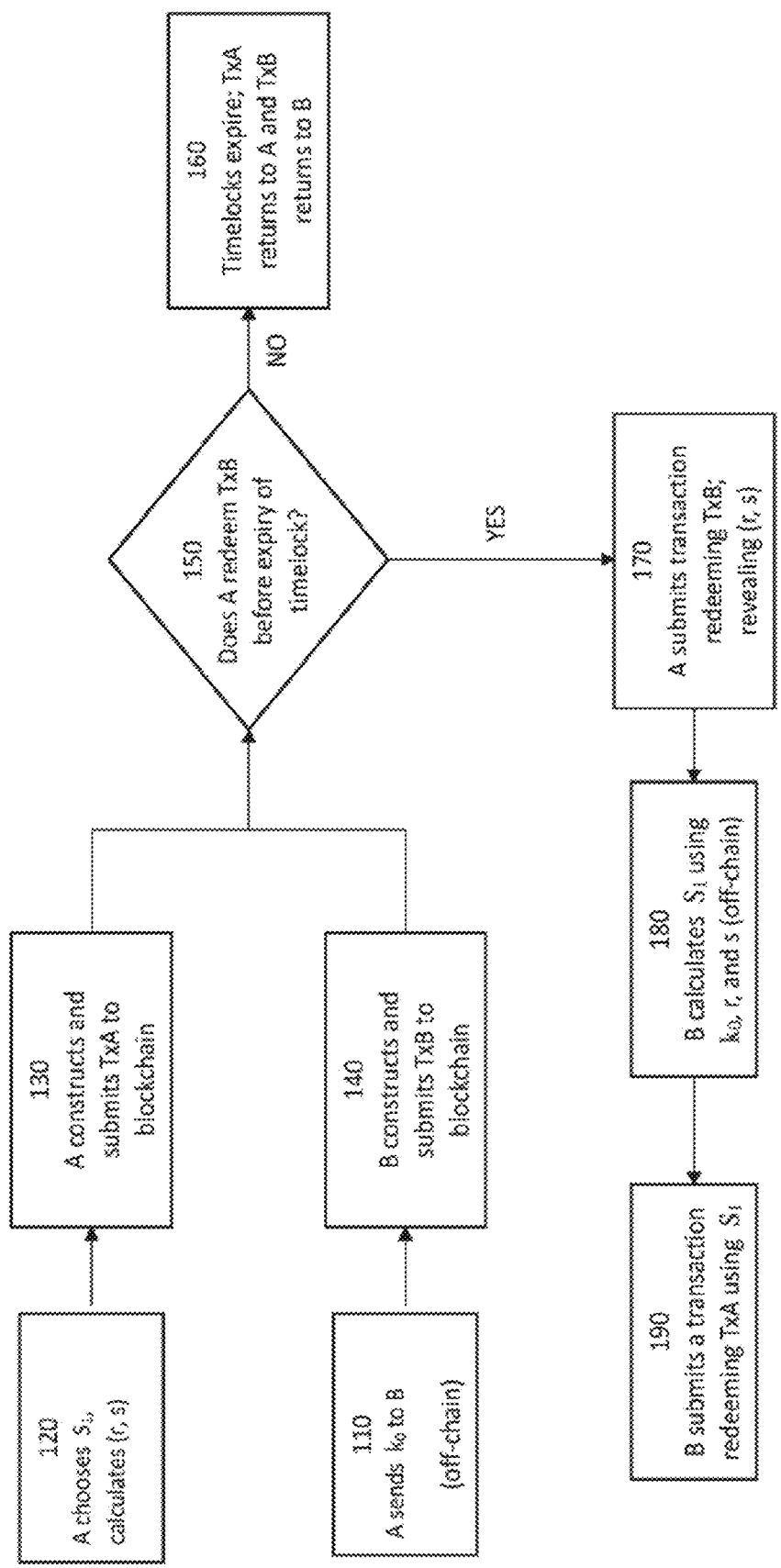
FIG. 3 illustrates a flow chart containing steps of an embodiment of the present disclosure.

A typical hash function, for example SHA-256, takes a data structure X and outputs a 256-bit number $H(X) \in \mathbb{Z}_{256}$. It is a one-way deterministic function $$X \mapsto H(X).$$

In the context of cryptocurrencies a hash function can be used to create a hash puzzle. This is a function $<\text{Solve } H(X)>$ that will evaluate to TRUE if and only if a pre-image X is provided in an input to the function. That is $<X><\text{Solve } H(X)>=\text{TRUE}.$ For SHA-256 such a function is given in bitcoin script by $<\text{Solve } H(X)>=\text{OP\_HASH256}<H(X)>\text{OP\_EQUAL-VERIFY}.$ Hash puzzles may be used in scripts, such as redeem scripts, of blockchain transactions to ensure that if the transaction is redeemed then the pre-image X must be exposed in the input of the redeem script and therefore visible on the blockchain.

| Input | Redeem script |
|---|---|
| $<X>$ | $<\text{Solve H }(X)>$ |

Under the ECDSA protocol, a signature for a private key $S_1$ and message hash H(m) is created in the following way (note that the message hash is known to everyone but the private key is only known to the person signing the message):

The first step is to produce a random number $k \in \mathbb{Z}_n^*$ known as the ephemeral key. From this the value r is derived, which is the x-coordinate of the ephemeral key multiplied by the generator point $$r = R_x(R_x, R_y) = k \cdot G.$$

The value r forms one half of the signature. The second half s is defined by the equation $$s = k^{-1}(H(m) + S_1 * r) \bmod n.$$

The combination (r, s)=Sig $P_1$ is the ECDSA signature.

One important feature of ECDSA is that if the ephemeral key k is known then the private key can be calculated as follows:

$$S_1 = r^{-1}(s*k - H(m)) \mod n.$$

The data structure of a signature (r, s) contains the integer values of r and s concatenated with some additional encoding data.

According to the Distinguished Encoding Rules (DER) [S. Blake-Wilson, D. Brown, P. Lambert, Use of Elliptic Curve Cryptography (ECC) Algorithms in Cryptographic Message Syntax (CMS), Network Working Group (2002); https://tools.ietf.org/html/rfc3278] the specific encoding of the data structure of an ECDSA signature (r, s) is given by the table shown in FIG. 1 (note that dummy r and s data values are used).

Referring to FIG. 1, note that the last byte, which represents the sighash type, is not standard DER encoding but is used in bitcoin signature encoding. The $4^{th}$ byte of the signature represents the length of r. This is either 32 bytes if the leading bit in the binary representation of r is 0, or 33 bytes if the leading bit is 1, in which case an extra zero-value byte is added to the byte-string. The $5^{th}$ byte to the $36^{th}$ or $37^{th}$ byte of the signature represent the value or r itself.

A method for creating a private key puzzle will now be described.

A private key puzzle is a function in a redeem script that will evaluate to TRUE if an input is provided that enables a private key $S_1$ of a given public key $P_1$ to be calculated A puzzle of this form allows the algebraic properties of Elliptic Curve Cryptography (ECC) public/private keypairs to be utilised in the implementation of resource access and control. If the sum of two public keys is calculated then the corresponding private key will be the sum of the individual private keys:

$$P_1 + P_2 = (S_1 + S_2) \cdot G.$$

Compare this to a hash function: if the sum of the hash of two values is calculated then the corresponding preimage is not usually the sum of the individual preimages:

$$H(X_1 + X_2) \neq H(X_1) + H(X_2).$$

Hash functions exist (known as homomorphic hash functions) for which the sum of the hash values of the individual preimages is equal to the hash value of the sum of the preimages, but these are generally not practicable to implement. Moreover, public/private key pairs allow for the encryption/decryption of data and the signing of messages using the Elliptic Curve Digital Signature Algorithm (ECDSA).

Examples of the private key puzzle in implementing atomic swaps are disclosed below. These examples allow users of the methods disclosed herein to perform cross-chain swaps on blockchains that do not share a common hash function. The examples include transfer of control of, or access to, a resource controlled by a public/private key pair.

Throughout this application, the private key puzzle is formulated in terms of ECC key pairs and the ECDSA protocol. However, the present disclosure is not restricted to these standards. For example, the method is also applicable to Schnorr signatures, and RSA key pairs with the DSA protocol.

As mentioned above, a private key puzzle is a function <Solve $P_1$> that will evaluate to TRUE if acting on a corresponding private key <$S_1$>. That is:

$$<S_1><\text{Solve } P_1> = \text{TRUE}.$$

Such a function does not currently exist. Inclusion of <Solve $P_1$> in a transaction redeem script would ensure that in order to redeem the transaction the input provided to the redeem script must include the corresponding private key $S_1$, which means that $S_1$ is exposed to the public on the blockchain. However, in at least the case where the redeem script is a redeem script of a blockchain transaction on the Bitcoin blockchain, such a function would require a prohibitively large number of operators which would prevent the transaction from being constructed and used. This problem is described in greater detail below.

Suppose there exists an operator OP_ECMULT that performs elliptic curve point multiplication. This means that a point on an elliptic curve, for example the generator point G, is multiplied by a positive integer, for example $S_1 \in \mathbb{Z}_n^*$. That is:

$$<S_1><G>\text{OP\_ECMULT} = <P_1>.$$

In this case the private key puzzle would be given by:

$$<\text{Solve } P_1> = <S_1><G>\text{OP\_ECMULT}<P_1>\text{OP\_EQUALVERIFY}.$$

However, at present, there is no such elliptic curve operator in bitcoin script.

After the reinstatement of some previously retired op codes in the bitcoin May 2018 fork, such as OP_MOD, there are technically all the operators required to perform elliptic curve multiplication within bitcoin script, i.e. to construct OP_ECMULT using other operators. However, there are practical reasons why this is not possible.

Such a function would require a minimum of 256 iterations, each iteration containing several lines of complicated operations. Most notably each iteration would require applying the extended Euclidean algorithm in order to take a modular inverse. Thus, this size of the script required would far exceed the limit of 201 op codes or 10 KB.

In contrast, the method presented below just uses a few lines of opcodes.

Embodiments of a method for creating and utilising a private key puzzle, that includes that the private key is calculated off-block, are disclosed below. In the embodiments, the private key itself is not exposed in the input of a redeem script, rather, a component of a signature is exposed.

The key idea is to require an unlocking script to contain a signature that is related to a specific ephemeral key. The corresponding private key can then be calculated from the signature by whoever knows the ephemeral key.

The embodiments, described with reference to Bitcoin script, do not use any non-standard script operations.

A function <Solve $P_1$, $r_0$> is constructed where $P_1$ is a public key and $r_0$ is derived from a specific ephemeral key $k_0$. This function evaluates to TRUE if and only if it operates on the input <Sig $P_1$, $r_0$> <$P_1$> where <Sig $P_1$, $r_0$> denotes the signature of $P_1$ using the specific ephemeral key $k_0$. Since a signature with a known ephemeral key exposes the corresponding private key, the private key may be calculated by anyone who knows $k_0$ once <Sig $P_1$, $r_0$> is made public.

With reference to FIG. 2, a bitcoin script that extracts the r part of the signature is disclosed. According to the DER encoding of the signature given above, in order to extract the r part we need to split the signature on the $5^{th}$ byte until the $36^{th}$ or $37^{th}$ byte, which is dependent on the value of the $4^{th}$ byte. This is achieved by the bitcoin script:

OP_3 OP_SPLIT OP_NIP OP_1 OP_SPLIT OP_SWAP OP_SPLIT OP_DROP.

Consider a public key $P_1$. As mentioned above, a method for creating a locking script such that the corresponding unlocking script exposes enough information for a controller of the ephemeral key to determine the private key of $P_1$ is disclosed.

The method includes forcing an unlocking script to contain a signature of $P_1$ that uses a specific ephemeral key, denoted $k_0$. The corresponding private key, denoted $S_1$, can be calculated from the signature by whoever knows the ephemeral key. Users of the method agree on a value of $k_0$ to use. The users may communicate this value to one another using suitably secure known methods.

As described above, an ECDSA signature is made up of two components, i.e.: Sig $P_1 = (r, s)$, where r is directly related to, and calculable from, the ephemeral key $k_0$.

The value of $r = R_x$ corresponding to ephemeral key $k_0$ is calculated (off-block) though the equation:

$$(R_x, R_y) = k_0 \cdot G.$$

A redeem script is then created that requires as an input a signature of $P_1$ that uses the specific ephemeral key $k_0$.

| Required Input | Redeem script |
| --- | --- |
| This comprises the signature (r, s) of $P_1$. This is calculated using the pre-determined ephemeral key $k_0$. It also contains the public key $P_1$ itself. | This comprises operators which carry out two steps:<br>1. An operation that checks that the correct pre-determined ephemeral key $k_0$ has been used in the signature. This can be achieved by using the operation OP_SPLIT to read off the value of r from the signature and check that it matches the value $r_0$ that is calculated using the ephemeral key $k_0$.<br>2. An operation that checks that the signature has been signed by $P_1$. This is just the standard operation OP_CHECKSIG. |

An example of a redeem script which is compatible with the bitcoin blockchain is given below:

| Input | Redeem script |
| --- | --- |
| <Sig $P_1$, $r_0$ > <$P_1$> | <Solve $P_1$, $r_0$> |

Where the script for key puzzle <Solve $P_1$, $r_0$> =

```
OP_TOALTSTACK OP_DUP
OP_3 OP_SPLIT OP_NIP OP_1 OP_SPLIT OP_SWAP
OP_SPLIT OP_DROP <r_0>
OP_EQUALVERIFY
OP_FROMALTSTACK OP_DUP OP_HASH160
<H(P_1)> OP_EQUALVERIFY
OP_CHECKSIG
```

In the above table, the first row places the public key $P_1$ on the alt-stack and duplicates the signature. The second row checks that the correct ephemeral key has been used. The third row retrieves the public key from the alt-stack and checks that the signature is valid. The bitcoin script operations used above, namely OP_DUP, OP_TOALTSTACK and OP_FROMALTSTACK, are not strict requirements and can be dropped if, for example, one duplicates and reorders the input variables.

Note that there are alternative ways to formulate the private key puzzle in bitcoin script. In particular, one may use the OP_CAT operation instead of OP_SPLIT. In this case, the input to the redeem script would be a partial signature that only contained the s component (which would be calculated using the pre-determined ephemeral key $k_0$ and the private key $S_1$. The redeem script would then concatenate the pre-determined value of r with the partial signature in order to produce a complete signature (r, s). This signature would, by construction, have the desired r. It would then be left to perform a standard checksig operation.

An atomic swap refers to two transactions, one from Alice to Bob and one from Bob to Alice. An atomic swap ensures that either both transactions are redeemable or neither are redeemable. The mechanism that allows this to happen is a hash puzzle within a redeem script. Advantages of atomic swaps include:

Cryptocurrencies on different blockchains may be exchanged. For example, Alice may send BCH to Bob and receive BTC from Bob.
  Coloured coins or other forms of tokens on the same blockchain may be exchanged.

Note that, currently, atomic exchange across different blockchains requires both blockchains to share a common hash function in their scripting language. An advantage of the present disclosure is that the blockchains no longer require a common hash function, thereby enabling transfer of control of, or access to, resources across a greater variety of blockchains. In addition, by basing the atomic exchange on a digital signature, it is possible to verify that the digital signature is consistent with the corresponding public key, thereby improving the security of the exchange.

A known method is described below to provide context for a subsequent description of an embodiment of the present disclosure.

Let $P_A$ and $P_B$ denote the ECDSA public keys of Alice and Bob respectively.

1. Alice chooses a secret $A_0 \in \mathbb{Z}_n^*$ known only to herself (n is the order of the elliptic curve generator point G).
2. Alice transfers funds to Bob that are locked with the redeem script <CheckSig $P_B$><Solve $H(A_0)$>

At this stage Bob cannot spend the funds as he doesn't know the preimage of $H(A_0)$.

3. Bob transfers funds to Alice that are locked with the redeem script

<CheckSig $P_A$><Solve $H(A_0)$>

4. Since Alice knows $A_0$ she can spend her funds. This reveals $A_0$ on the blockchain as input for Alice's redeem script.

Bob now knows $A_0$ and can spend his funds.

The private key puzzle of the present disclosure, described earlier, may be used to effect atomic swaps between users of one or more blockchains without the requirement of a shared hash function. A method for implementing such an atomic swap is described below.

Instead of using a hash puzzle in an atomic swap the private key puzzle disclosed above is used. This retains all the functionality of a known atomic swap whilst allowing for advantageous generalisations, which include:

Atomic swaps across blockchains that do not share a common hash function; and
  The atomic exchange of control of, or access to, a resource controlled by a public/private keypair.

As described above, when using the private key puzzle rather than a hash puzzle, when Alice redeems a transaction, instead of revealing the preimage of a hash, she enables the private key of a known public key to be determined. This contrast is illustrated in the table below:

| | Mechanism |
|---|---|
| Standard atomic swap | Hash puzzle <Solve H(A$_0$)> |
| Generalised atomic swap | Private key puzzle <Solve P$_1$, r$_0$> |

An embodiment of the present disclosure is described, with reference to FIG. 3, in terms of the method steps below:

1. (110) Alice chooses ephemeral key $k_0$ and sends it to Bob via a suitably secure channel. Alternatively, Alice and Bob may agree on $k_0$.
2. (120) Alice chooses a private key $S_1 \in \mathbb{Z}_n^*$ known only to herself. She calculates the corresponding public key $P_1 = S_1 \cdot G$.
3. (130) Alice creates a transaction TxA having the redeem script <CheckSig $P_B$><Solve $P_1, r_0$>

Where $P_B$ is Bob's public key and <Solve $P_1, r_0$> is the private key puzzle introduced above. At this stage, Bob cannot redeem the transaction as he doesn't know the private key corresponding to public key $P_1$, i.e. $S_1$. Alice submits TxA to the blockchain.
4. (140) Bob creates a transaction TxB having the redeem script <CheckSig $P_A$><Solve $P_1, r_0$>

Where $P_A$ is Alice's public key. Bob submits TxB to the blockchain.
5. (150) Since Alice knows $S_1$ she can redeem TxB. As input for the redeem script of TxB, Alice must provide a signature for $P_1$ using the specific ephemeral key $k_0$. Redemption of TxB by submission of a redeeming transaction presenting an unlocking script to TxB to the blockchain necessarily makes public the value of s. Given that he already knows the value of the ephemeral key $k_0$, this revelation of s allows Bob to calculate the private key $S_1$. (160) There may or may not be a time constraint imposed on the redemption of TxA and TxB using timelock functions, which, if the times expire, are configured to enable control of TxA and TxB to be returned to Alice and Bob by means of Alice and Bob submitting suitable refund transactions to the blockchain.
6. (170) If Alice redeems TxB, (180) Bob is able to calculate $S_1$ and (190) can redeem Tx1 by providing thereto by means of an unlocking script of a redeeming transaction a signature corresponding to $S_1$.

As this method does not rely on a hash puzzle it can be used to make atomic swaps across blockchains that do not share a common hash function in their scripting languages. All that is required is that the scripting languages contain enough functionality to create a private key puzzle. This is a less restrictive set of requirements.

Figure 4:
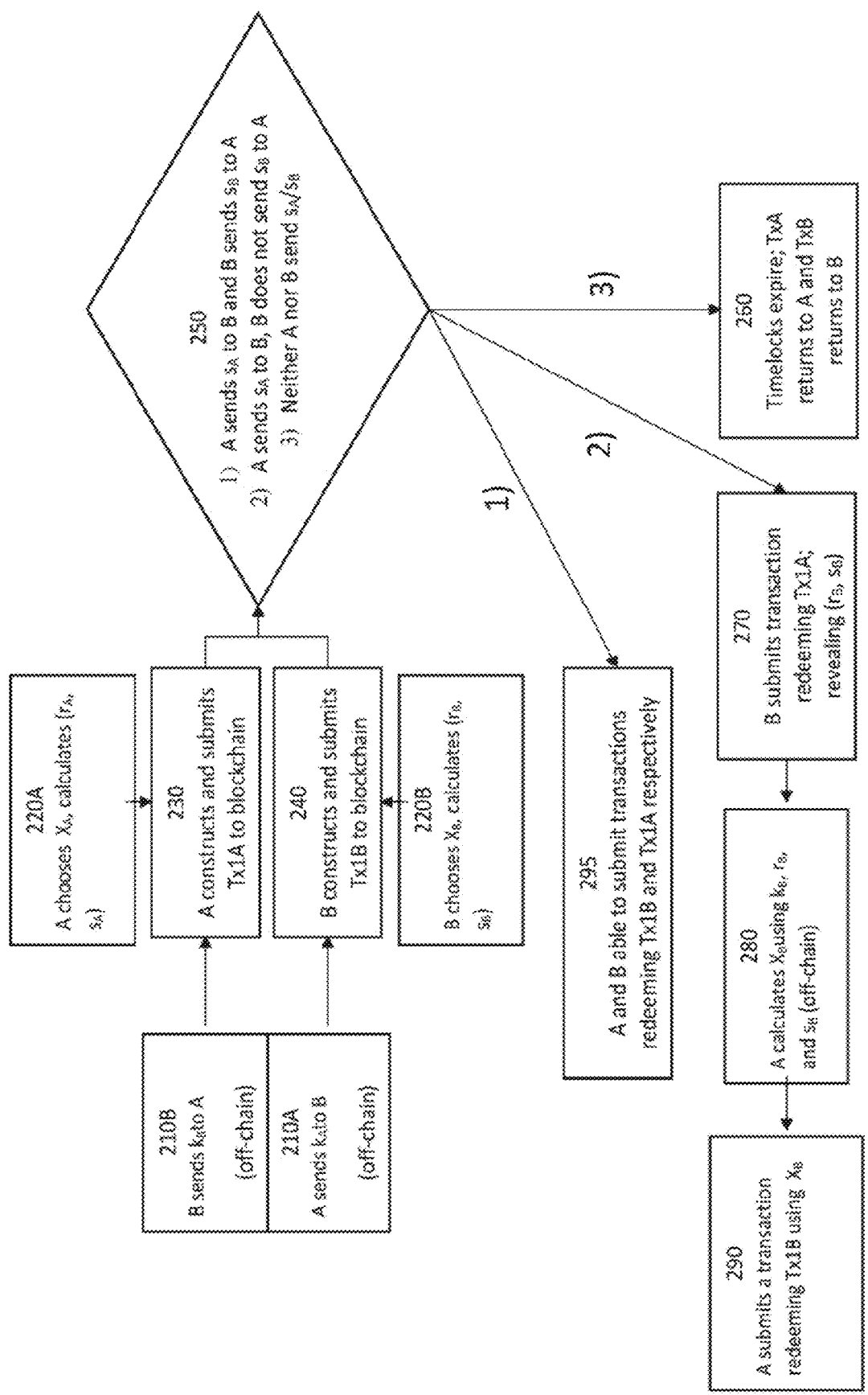
FIG. 4 illustrates a flow chart containing steps of an embodiment of the present disclosure.

With reference to FIG. 4, in a further embodiment, Alice and Bob each choose their own ephemeral keys $k_A$ and $k_B$ and their own private keys $X_A$ and $X_B$. They exchange their ephemeral keys in a similar manner to how they communicate ephemeral key $k_0$ of the above-described asynchronous embodiment. Alice and Bob may then calculate signature components $r_A$, which is the x component of point $k_A \cdot G$ and $r_B$, the x component of point $k_B \cdot G$. The remaining signature components of the signatures calculated using $X_A$ and $X_B$ are respectively denoted $s_A$ and $s_B$, so that Sig $X_A = (r_A, s_A)$ and Sig $X_B = (r_B, s_B)$. Note that $k_A$ and $k_B$ may or may not be identical in this embodiment, i.e. a common $k_0$ may be used instead.

This embodiment is carried out according to the following steps:

1. (210A, 210B) Alice and Bob choose their own ephemeral keys $k_A$ and $k_B$, and communicate them to each other.
2. (220A) Alice chooses a private key $X_A \in \mathbb{Z}_n^*$ known only to herself. She calculates the corresponding public key $Y_A = X_A \cdot G$.
3. (230) Alice creates a transaction TxA having the redeem script <CheckSig $P_B$><Solve $Y_A, Y_B, r_A, r_B$>

Where $P_B$ is Bob's public key and <Solve $Y_A, Y_B, r_A, r_B$> is the private key puzzle requiring the provision of signatures corresponding to private keys $X_A$ and $X_B$. At this stage, Bob cannot redeem the transaction as he doesn't know the private key corresponding to public key $Y_A$, i.e. $X_A$.
4. (220B) Bob chooses a private key $X_B \in \mathbb{Z}_n^*$ known only to himself. He calculates the corresponding public key $Y_B = X_B \cdot G$.
5. (240) Bob creates a transaction Tx1B having the redeem script <CheckSig $P_A$><Solve $Y_A, Y_B, r_A, r_B$>

Where $P_A$ is Alice's public key.

Note that the key puzzle portions of the scripts of TxA and Tx1B are identical. The key puzzle, <Solve $Y_A, Y_B, r_A, r_B$>, requires presentation thereto of signatures corresponding to private keys $X_A$ and $X_B$, i.e. signatures $(r_A, s_A)$ and $(r_B, s_B)$.

(250) At this point, Alice does not know $X_B$, nor can she calculate it as she does not know $s_B$. Similarly, Bob does not know $X_A$ or $s_A$. Neither Alice nor Bob therefore have enough information to redeem Tx1A or Tx1B. Both Alice and Bob may act honestly by each communicating their respective signature component $s_A/s_B$ or private key $X_A/X_B$ to the other, or only one of them may act honestly, or neither may. One of the following outcomes may therefore occur:

6A. 1) Assume Alice sends Bob $s_A$ or $X_A$, and Bob sends Alice $s_B$ or $X_A$ (i.e. both parties act honestly). (295) Then, both Alice and Bob have enough information to provide signatures to the redeem scripts of transactions Tx1A and Tx1B that solve the key puzzles therein. Tx1A and Tx1B can therefore be redeemed by Bob and Alice respectively by submission of spending transactions presenting respective unlocking scripts to Tx1A and Tx1B.

6B. 2) Assume only Alice acts honestly, by sending Bob $s_A$ or $X_A$, and Bob acts dishonestly by either not sending Alice a correct $s_B$ or $X_B$ or by not sending anything at all. (270) Bob is then able to redeem Tx1A by submitting a redeeming transaction providing a signature in its unlocking script, corresponding to $X_A$, to solve the key puzzle contained in Tx1A's redeem script. Once Bob has submitted a redeeming transaction, containing an unlocking script arranged to redeem Tx1A, to the blockchain, the signature $(r_B, s_B)$ is made publicly available. (280) Alice is thereby made aware of the value $s_B$ which, as she knows ephemeral key $k_B$, enables her to calculate key $X_B$, and therefore to have enough information to redeem Tx1B. (290) Alice then submits a redeeming transaction providing a signature in its unlocking script, corresponding to $X_B$, to solve the key puzzle contained in Tx1B's redeem script.

6C. 3) Assume neither Alice nor Bob sends the other either $s_A/s_B$ or $X_A/X_B$ (260) Transactions Tx1A and Tx1B remain unredeemable in this case, until such time as a timelock (if active) expires to enable control of the transactions to be returned to their respective owners by means of the respective owners submitting suitable redeem transactions to the blockchain.

A symmetrical configuration of transactions as described in the above embodiment enables synchronous atomic swaps to take place using transactions configured with key puzzles. This enables both transactions Tx1A and Tx1B to transfer access to, or control of, respective resources to the other party simultaneously, instead of a party having to wait for a block to be mined to reveal necessary information for redeeming a transaction dependent on said necessary information.

Figure 5:
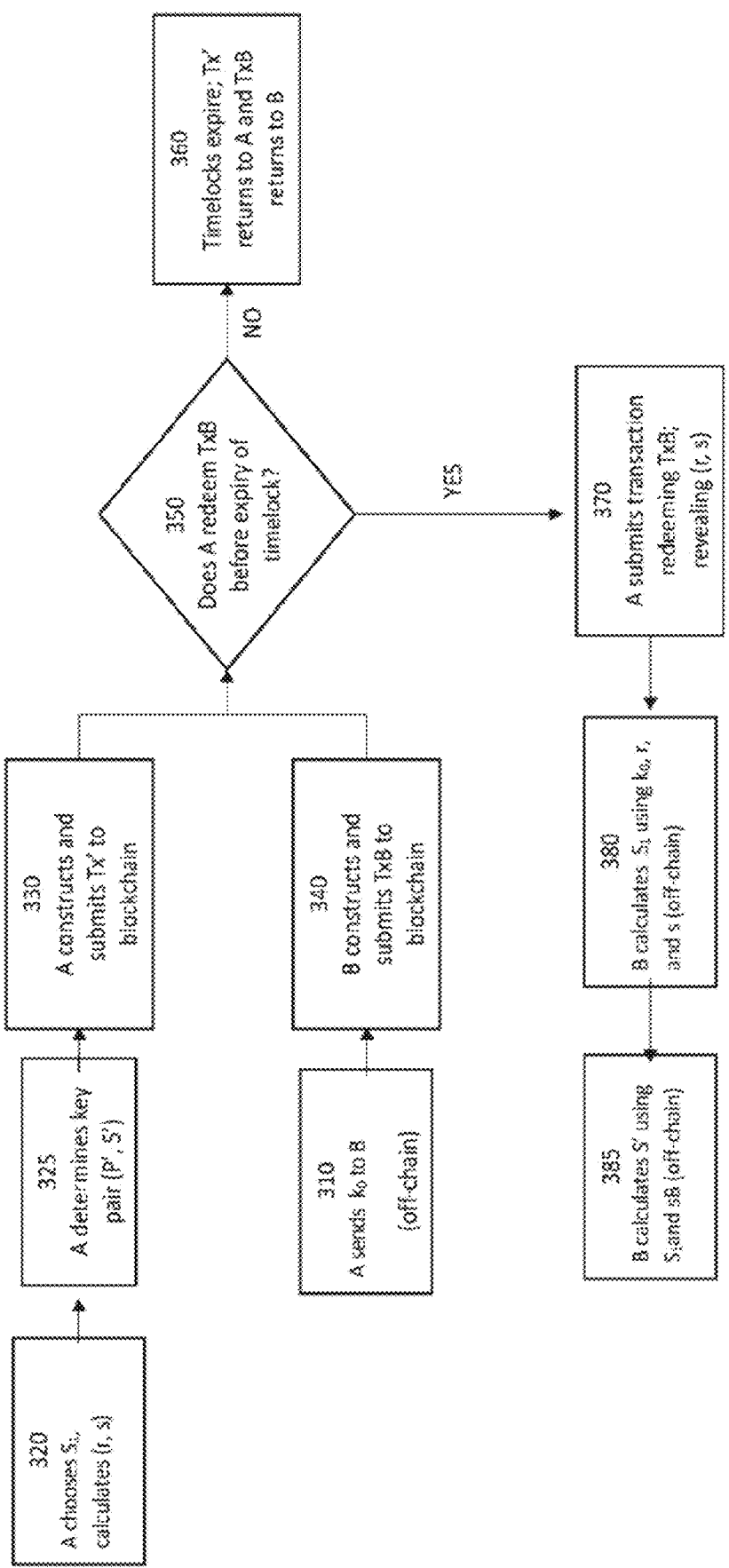
FIG. 5 illustrates a flow chart containing steps of an embodiment of the present disclosure.

An embodiment of the present disclosure will now be described with reference to FIG. 5 which enables the atomic exchange of access to, or control of, one or more resources.

In this embodiment, Alice controls access to a resource via an ECC public/private key pair. This resource could be funds of one type of cryptocurrency, it could be funds in multiple types of cryptocurrency, or it could be access to a webapp, a rental car, or an encrypted document, or control of an Internet of Things smart device, such as a webcam or door lock. Below, a method is presented for Bob to gain access to this resource from Alice, using the Bitcoin protocol. This exchange is atomic: either Alice redeems the BCH she has received from Bob and Bob gains access to or control of the resource, or neither happen.

As an example, consider Bob transferring funds in BCH to Alice and Alice transferring funds in BCH, Ethereum (ETH) and DASH to Bob.

This method ensures that the information required by controllers of the ephemeral key to calculate the private key that controls the resource is exposed when the atomic swap is complete. This removes the need for trust in the party granting access to the controlled resource.

The method includes the following steps:
1. (310) Alice chooses ephemeral key $k_0$ and communicates it to Bob.
2. (320) Alice chooses a private key $S_1 \in \mathbb{Z}_n^*$ known only to herself. She calculates the corresponding public key $P_1 = S_1 \cdot G$. This public key controls access to a resource, and is openly broadcast.
   (In this example the resource is funds in BCH, ETH and DASH locked with public key $P_1$.)
3. (325) Alice calculates deterministic public key $P' = P_1 + P_B = P_1 + S_B \cdot G$ using Bob's public key $P_B$ and (330) enables access to the resource to be obtained by the owner of the private key $S' = S_B + S_1$ of the public key $P'$. For example, this may be achieved by creating a transaction Tx' that sends an amount of cryptocurrency to the address P', or by encrypting a document with the public key P' and then broadcasting the document on an open forum.
   (In this example Alice makes BCH, ETH and DASH transactions to a common address, each locked with common public key P'.)
4. (340) Bob submits a transaction TxB locked with the redeem script <CheckSig $P_A$><Solve $P_1, r_0$>

5. (370) Since Alice knows $S_1$ she is able to redeem TxB. In this example, this is done on the BCH blockchain. As described above, this allows Bob to calculate $S_1$ from the information provided in the input to Alice's redeem script. (360) There may or may not be a time constraint imposed on the redemption of Tx' and TxB using timelock functions, which, if the times expire, are configured to enable control of Tx' and TxB to be returned to Alice and Bob.
6. (370) Alice redeems transaction TxB by submitting a redeeming transaction providing a signature corresponding to $S_1$ in an unlocking script, revealing the s part of the signature to Bob.
7. (380) Bob now calculates $S_1$ and therefore is able to (385) calculate the private key $S' = S_B + S_1$ of P'. He thereby gains access to the resource controlled by P'.
   (In this example Bob can now spend the funds in BCH, ETH and DASH that were locked with the public key P'.)

Note that even if the private key $S_1$ is exposed to the public, on the blockchain or otherwise, it is only Bob who can access, or control, the resource locked at P'. This is because the resource is locked with the combination of $S_1$ and Bob's private key. In this sense $S_1$ acts as a deterministic key.

In this example it can be seen that it is no longer required that the cryptocurrencies that Bob is buying contain certain operations in their scripting language. It is only required that Bob pays for the collection of cryptocurrencies in BCH and that the transactions are controlled using ECDSA signatures.

In order to avoid Bob's resource being locked forever by Alice, a time-locked return can be introduced to the method. This is a BCH transaction from Alice to Bob that returns the resource to Bob after a certain relative time has passed since his first transaction to Alice, for example 24 hours.

Similarly, Alice may return access to her controlled resource back to herself after a certain amount of time has passed. In the example of multiple cryptocurrencies this would also be a return transaction, similar to Bob's.

It may not be necessary or practical for Alice to return control of the resource back to herself after a certain amount of time has passed if the swap is not completed. For example, if the resource is an encrypted document for which Bob is granted access to then there is no disadvantage to Alice in leaving the document encrypted with the key P' indefinitely.

Figure 6:
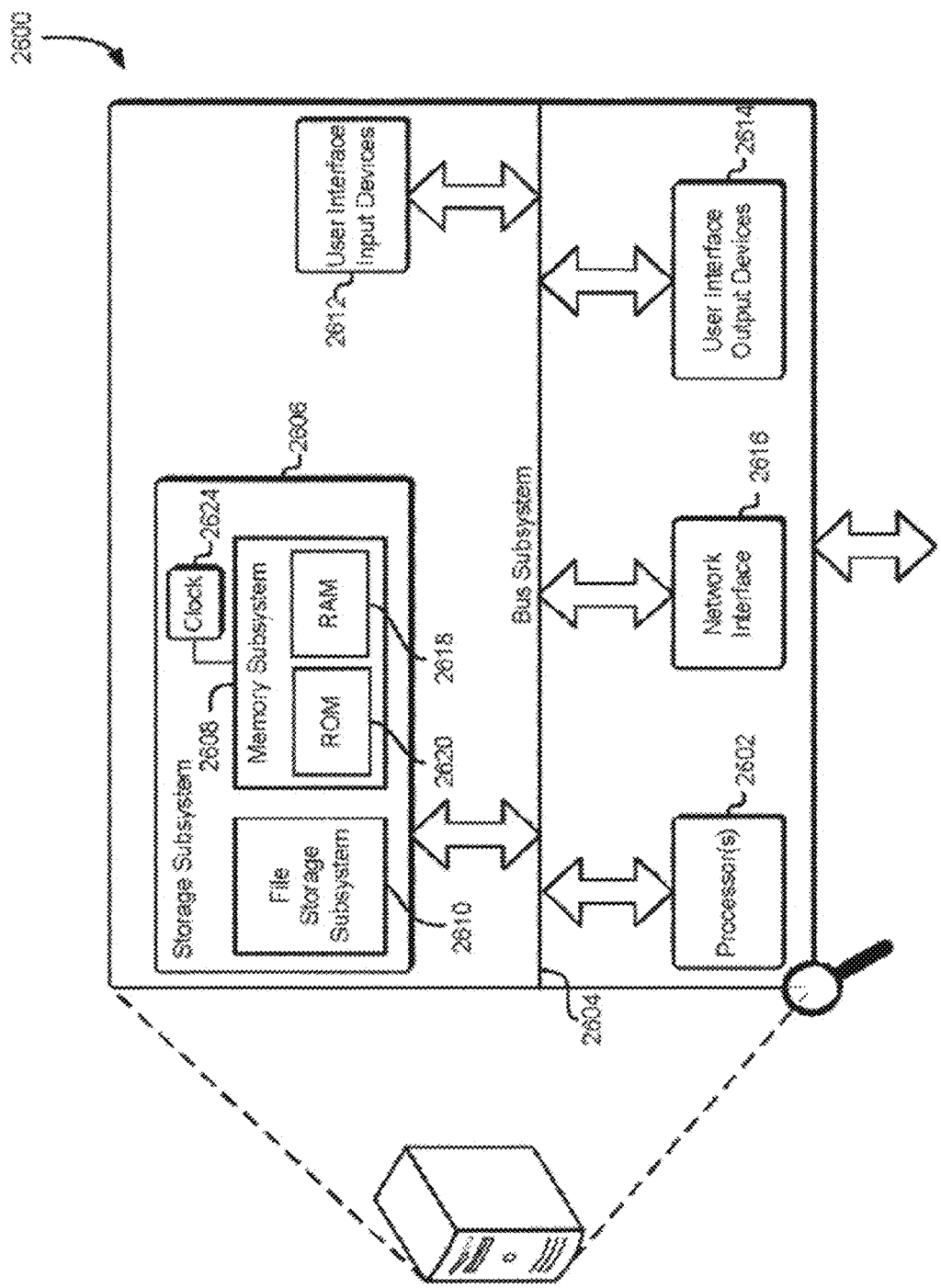
FIG. 6 is a schematic diagram illustrating a computing environment in which various embodiments can be implemented.

Turning now to FIG. 6, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 6, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 6 is intended only as a specific example for purposes of illustrating the preferred embodiment of the device. Many other configurations having more or fewer components than the system depicted in FIG. 6 are possible.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method, the method comprising the steps of:
   generating a first signature comprising a first component and a second component from a data item and a first secret value, wherein the data item is a first private key of a first cryptographic key pair and is determinable only by a controller of at least the second component and the first secret value, and the first secret value is an ephemeral key used to generate the signature;
   providing a first blockchain transaction redeemable to enable access to a first resource by providing at least the first signature to the first blockchain transaction, wherein the first blockchain transaction further requires providing a second signature to be redeemable, and a second cryptographic key pair is associated with an intended recipient of the first resource; and
   providing the second component to a controller of the secret value to enable the controller to determine the data item, by:
      providing a second blockchain transaction redeemable to enable access to a second resource by providing at least the second component of the first signature to the second blockchain transaction, wherein redemption of the second blockchain transaction causes the second component to be provided to the controller, and redeeming the second blockchain transaction.

2. The method of claim 1, wherein the method further comprises:

generating the second signature comprising a third component and a fourth component from a second private key of the second cryptographic key pair and a second secret value; and providing the second component to the controller.

3. The method of claim 1, wherein the data item comprises a deterministic private key of a deterministic cryptographic key pair, wherein a deterministic public key of the deterministic cryptographic key pair is derived using a first public key of the first cryptographic key pair and a second public key of the second cryptographic key pair.

4. The method of claim 1, wherein redemption of the first or second blockchain transaction comprises comparing a value stored in the first blockchain transaction to at least a portion of the first signature.

5. A system, comprising:

a processor; and memory including executable instructions that, as a result of execution by the processor, causes the system to:

generate a first signature comprising a first component and a second component from a data item and a first secret value, wherein the data item is a first private key of a first cryptographic key pair and is determinable only by a controller of at least the second component and the first secret value, and the first secret value is an ephemeral key used to generate the signature;

provide a first blockchain transaction redeemable to enable access to a first resource by providing at least the first signature to the first blockchain transaction, wherein the first blockchain transaction further requires providing a second signature to be redeemable, and a second cryptographic key pair is associated with an intended recipient of the first resource; and provide the second component to a controller of the secret value to enable the controller to determine the data item, by:

providing a second blockchain transaction redeemable to enable access to a second resource by providing at least the second component of the first signature to the second blockchain transaction, wherein redemption of the second blockchain transaction causes the second component to be provided to the controller, and redeeming the second blockchain transaction.

6. A non-transitory computer-readable storage medium having stored thereon executable instructions that, as a result of being executed by a processor of a computer system, cause the computer system to:

generate a first signature comprising a first component and a second component from a data item and a first secret value, wherein the data item is a first private key of a first cryptographic key pair and is determinable only by a controller of at least the second component and the first secret value, and the first secret value is an ephemeral key used to generate the signature;

provide a first blockchain transaction redeemable to enable access to a first resource by providing at least the first signature to the first blockchain transaction, wherein the first blockchain transaction further requires providing a second signature to be redeemable, and a second cryptographic key pair is associated with an intended recipient of the first resource; and provide the second component to a controller of the secret value to enable the controller to determine the data item, by:

providing a second blockchain transaction redeemable to enable access to a second resource by providing at least the second component of the first signature to the second blockchain transaction, wherein redemption of the second blockchain transaction causes the second component to be provided to the controller, and redeeming the second blockchain transaction.

* * * * *